(12) United States Patent
    Bailie

(10) Patent No.: US 7,526,826 B2
(45) Date of Patent: May 5, 2009

(54) FOLDING RAMP

(75) Inventor: David A Bailie, Kent, WA (US)

(73) Assignee: Homecare Products, Inc., Auburn, WA (US)

( * ) Notice: Subject to any disclaimer, the term of this patent is extended or adjusted under 35 U.S.C. 154(b) by 0 days.

(21) Appl. No.: 11/517,863

(22) Filed: Sep. 6, 2006

(65) Prior Publication Data

US 2007/0234491 A1    Oct. 11, 2007

Related U.S. Application Data

(60) Provisional application No. 60/789,638, filed on Apr. 6, 2006.

(51) Int. Cl.
    *E01D 1/00*    (2006.01)
(52) U.S. Cl. .................... 14/69.5; 414/537
(58) Field of Classification Search ............ 14/69.5; 414/921, 537; 119/843; D34/32
    See application file for complete search history.

(56) References Cited

U.S. PATENT DOCUMENTS

| D246,449 | S | * | 11/1977 | Poe ........................ D34/32 |
|---|---|---|---|---|
| 4,443,905 | A | * | 4/1984 | Kopp ........................ 14/69.5 |
| 5,347,672 | A | * | 9/1994 | Everard et al. ............ 14/69.5 |
| 5,791,717 | A | * | 8/1998 | Reich et al. ............... 296/61 |
| 5,933,898 | A | * | 8/1999 | Estes et al. ................ 14/69.5 |
| 6,009,587 | A | * | 1/2000 | Beeman .................... 14/69.5 |
| D420,175 | S | * | 2/2000 | Garrels, Jr. ............... D30/119 |
| 6,119,634 | A | * | 9/2000 | Myrick ..................... 119/847 |
| 6,389,629 | B1 | * | 5/2002 | Schouest .................. 14/69.5 |
| 6,430,769 | B1 | * | 8/2002 | Allen ........................ 14/69.5 |
| 6,602,041 | B2 | * | 8/2003 | Lewis et al. .............. 414/537 |
| 6,715,177 | B1 | * | 4/2004 | Lagergren-Julander .. 14/69.5 |
| 6,725,487 | B2 | * | 4/2004 | Myrick et al. ............ 14/69.5 |
| 6,736,279 | B2 |  | 5/2004 | Allen |
| 7,043,789 | B2 | * | 5/2006 | Morrish ................... 14/69.5 |
| 2002/0078513 | A1 | * | 6/2002 | Schouest .................. 14/69.5 |
| 2003/0213072 | A1 | * | 11/2003 | Myrick et al. ............ 14/69.5 |

* cited by examiner

*Primary Examiner*—Raymond W Addie
(74) *Attorney, Agent, or Firm*—Christensen O'Connor Johnson Kindness PLLC

(57) ABSTRACT

A folding ramp (20) generally includes at least first and second ramp sections (24 and 26), and a first hinge assembly (22) coupling the first and second ramp sections. The first hinge assembly includes adjacent first and second collars (44A and 44B), wherein a first portion of a tongue and groove coupling device (60A) of the first collar is coupled to a second portion of the tongue and groove coupling device (62A) of the first ramp section and a first portion of a tongue and groove coupling device (60B) of the second collar is coupled to a second portion of a tongue and groove coupling device (62B) of the second ramp section. The first hinge assembly further includes a hinge pin (48), wherein the first and second collars are designed and configured to rotate in opposite directions around the hinge pin.

14 Claims, 12 Drawing Sheets

US 7,526,826 B2

FOLDING RAMP

CROSS-REFERENCE TO RELATED APPLICATION

This application claims the benefit of U.S. Provisional Patent Application No. 60/789,638, filed Apr. 6, 2006, the disclosure of which is hereby expressly incorporated by reference.

TECHNICAL FIELD

Embodiments of the present disclosure relate generally to ramps and inclines and, more specifically, to portable folding ramps and inclines having hinge assemblies.

BACKGROUND

Portable folding ramps provide a portable inclined surface on which a user can travel between a lower and an upper elevation, for example, on a set of stairs. Portable folding ramps currently in use are generally designed to be compact and lightweight for easy storage and carrying. Such ramps generally have hinge assemblies between ramp sections that are welded in place and therefore are labor intensive to manufacture and susceptible to hinge fatigue over time. Hence, there exists a need for an improved folding ramp having a hinge assembly that has improved ease of manufacture and is less susceptible to hinge fatigue.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a folding ramp is provided. The folding ramp includes at least first and second ramp sections and a first hinge assembly coupling the first and second ramp sections. The first hinge assembly allows the first and second ramp sections to be rotatably positionable between ramp folded and ramp extended orientations. The first hinge assembly includes adjacent first and second collars, wherein a first portion of a tongue and groove coupling device of the first collar is coupled to a second portion of the tongue and groove coupling device of the first ramp section and a first portion of a tongue and groove coupling device of the second collar is coupled to a second portion of a tongue and groove coupling device of the second ramp section. The first hinge assembly further includes a hinge pin, wherein the first and second collars are designed and configured to rotate in opposite directions around the hinge pin.

In accordance with another embodiment of the present disclosure, a method of manufacturing a folding ramp is provided. The method includes cutting an elongated tubular collar having a first portion of a tongue and groove coupling device into at least first and second hinge collars. The method further includes slideably coupling the first and second hinge collars to a hinge pin. In addition, the method includes slideably coupling the first hinge collar to a first ramp section by a second portion of a tongue and groove coupling device and slideably coupling the second hinge collar to a second ramp section by a second portion of a tongue and groove coupling device, such that the first and second collars are designed and configured to rotate in opposite directions around the hinge pin.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
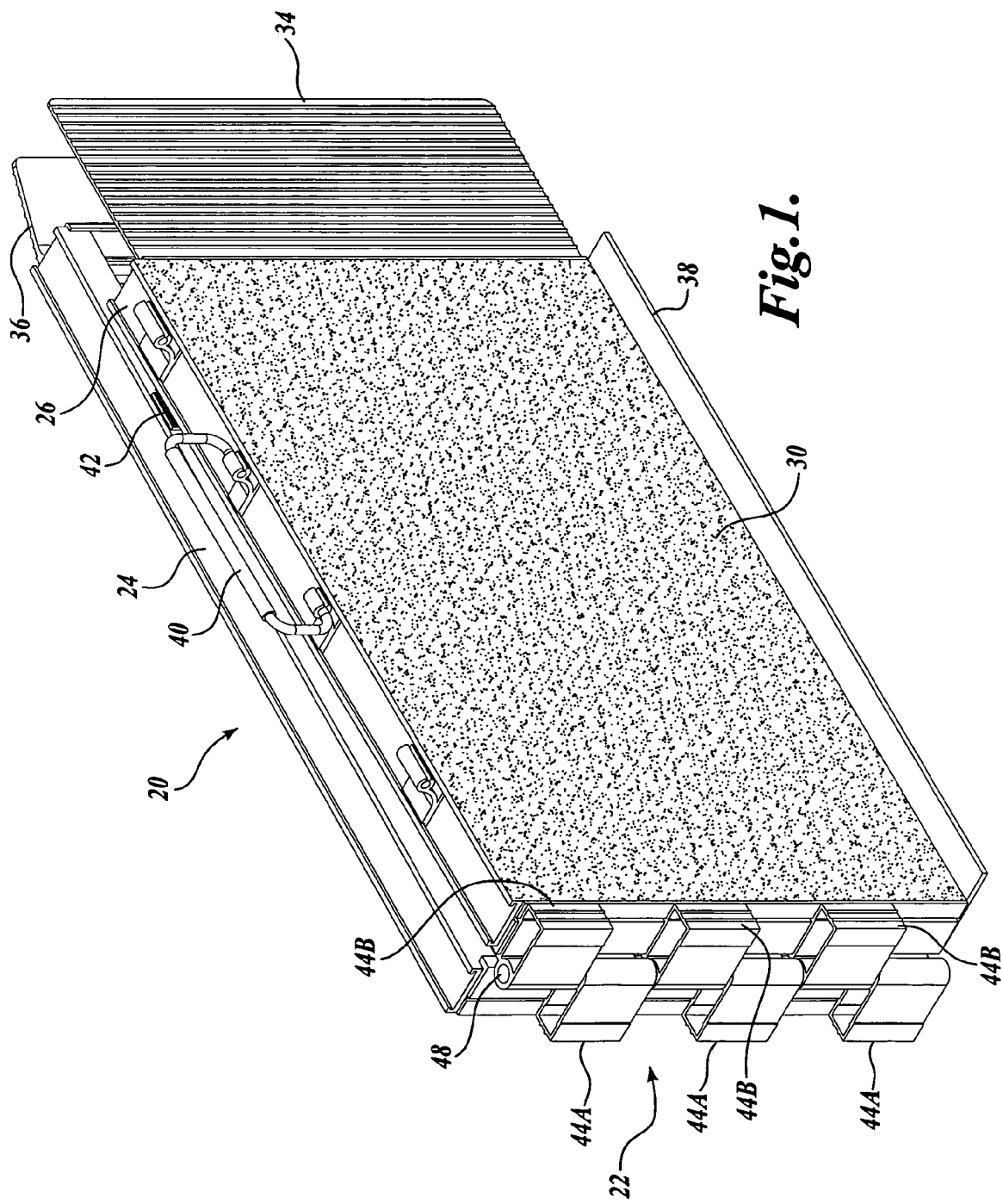
FIG. 1 is a perspective view of an exemplary embodiment of a folding ramp formed according to various aspects of the present disclosure, wherein the folding ramp is in a ramp folded orientation.
Figure 2:
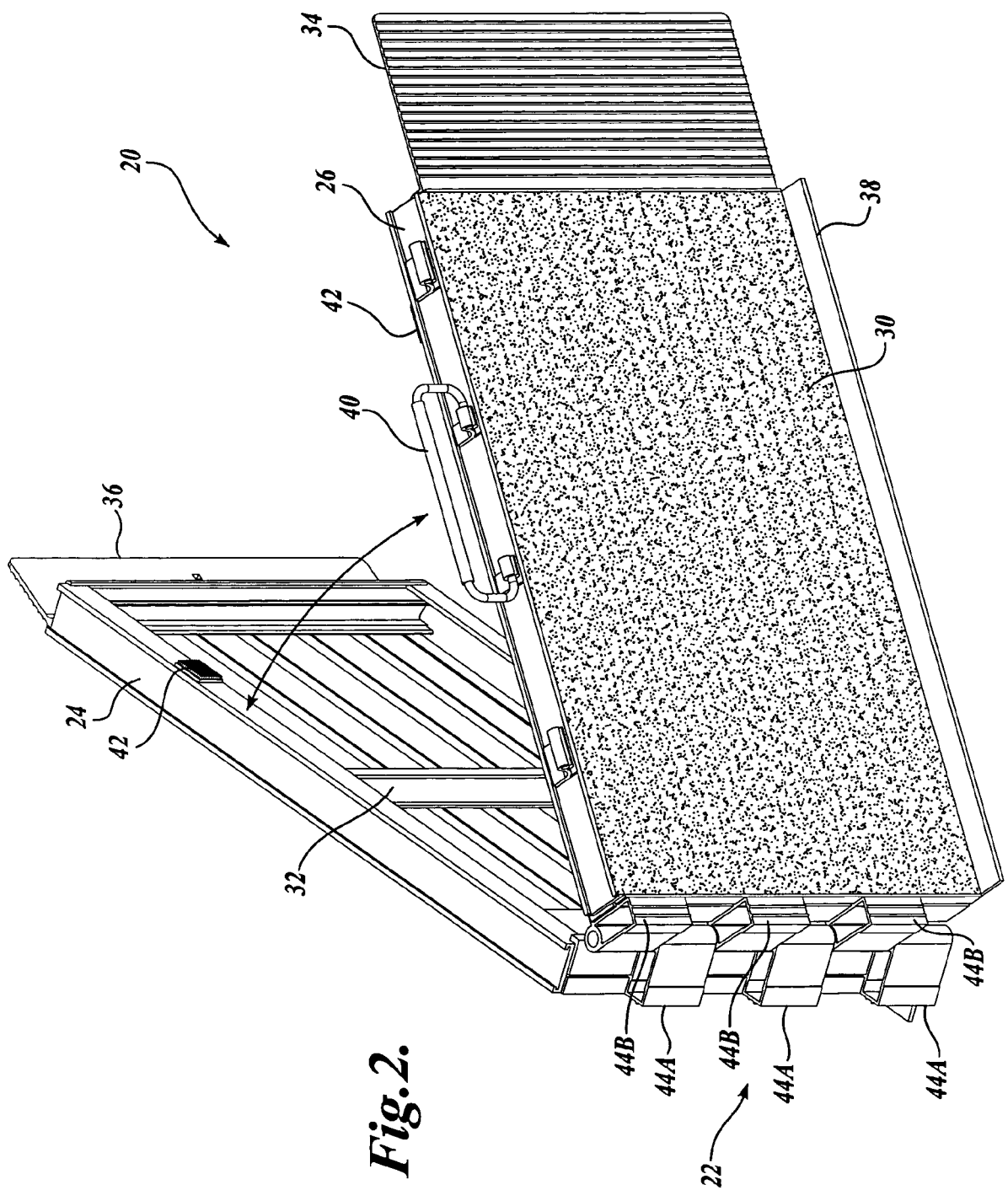
FIG. 2 is a perspective view of the folding ramp of FIG. 1, wherein the folding ramp is in transition between the ramp folded orientation and a ramp extended orientation.
Figure 3:
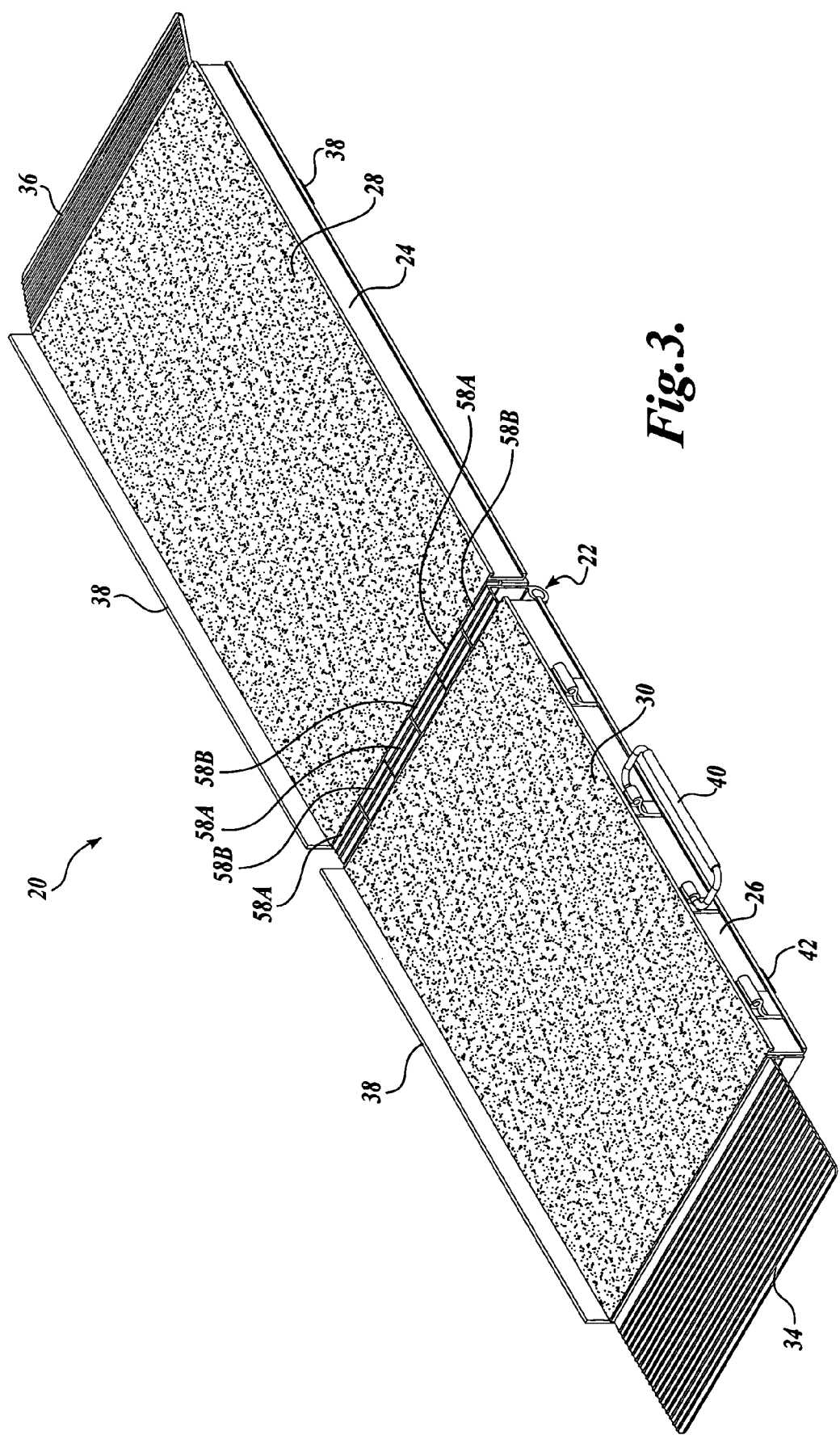
FIG. 3 is a perspective view of the folding ramp according to the embodiment of FIG. 1, wherein the folding ramp is in the ramp extended orientation.

Embodiments of the present disclosure are generally directed to portable folding ramps having hinge assemblies. Turning to FIGS. 1-7, a folding ramp 20 having a hinge assembly 22 constructed in accordance with the one embodiment of the present disclosure is shown. The folding ramp 20 generally includes first and second ramp sections 24 and 26 interconnected by the hinge assembly 22 such that the first and second ramp sections 24 and 26 pivot on the hinge assembly 22 between a ramp folded orientation (see FIG. 1) and a ramp extended orientation (see FIG. 3), as seen in the sequence of FIGS. 1-3.

In the extended orientation (FIG. 3), the first and second ramp sections 24 and 26 form portions of a ramp platform, upon which a user can travel between an upper elevation and a lower elevation. The ramp sections 24 and 26 include deck sections 28 and 30 and support members 32 (FIG. 2), wherein the support members 32 attach to the bottom surfaces of the deck sections 28 and 30 for providing support to the deck sections 28 and 30. The ramp sections 24 and 26 further include first and second transition plates 34 and 36 that provide transition surfaces or resting contacts from a surface of the lower elevation to the ramp platform and from the ramp platform to a surface of the upper elevation. Moreover, the ramp sections 24 and 26 optionally include curb elements 38, for example, to guide a wheelchair along the deck sections 28 and 30. The folding ramp 20 can be made from any rigid material known and used in the art. As a non-limiting example, the folding ramp 20 is made of lightweight aluminum.

Turning now to FIG. 1, when the folding ramp 20 is in the folded orientation, the deck sections 28 and 30 of the first and second ramp sections 24 and 26 are substantially parallel to one another and oriented in an overlapping relationship to one another, such that the ramp 20 becomes compact for carrying. As a non-limiting example, and as seen in FIG. 1, the deck sections 28 and 30 face away from one another in the folded orientation. When the folding ramp 20 is in the extended orientation, as best shown in FIG. 3, the deck sections 28 and 30 lie flush with one another to provide a substantially planar ramp platform. It should be apparent that the folding ramp 20 is properly used in a certain orientation such that the deck sections 28 and 30 of the ramp platform are facing upward and substantially perpendicular to the direction of gravitational force such that the ramp platform can be traveled upon safely by a user.

The folding ramp 20 described above may include other optional features. For example, it should be appreciated that top surfaces of the deck sections 28 and 30 may be grooved or textured for providing slip resistance. In addition, when in the folded orientation (see FIG. 1), the ramp 20 can be transported using one or more bracketed handles 40 secured along the side edge of the first and/or second ramp sections 24 and/or 26. Further, the first and second ramp sections 24 and 26 may include a fastening device 42 for maintaining the ramp 20 in the folded orientation. As a non-limiting example and as seen in FIGS. 1-7, the fastening device 42 is a two-piece male/female press fastener positioned on the inner facing surfaces of the first and second ramp sections 24 and 26, which when engaged, maintains the ramp 20 in the folded orientation. It should be appreciated, however, that other fastening devices generally known and used in the art besides press fasteners, such as hooks, straps, snaps, or belts, may be used to maintain the ramp 20 in the folded orientation.

Figure 4:
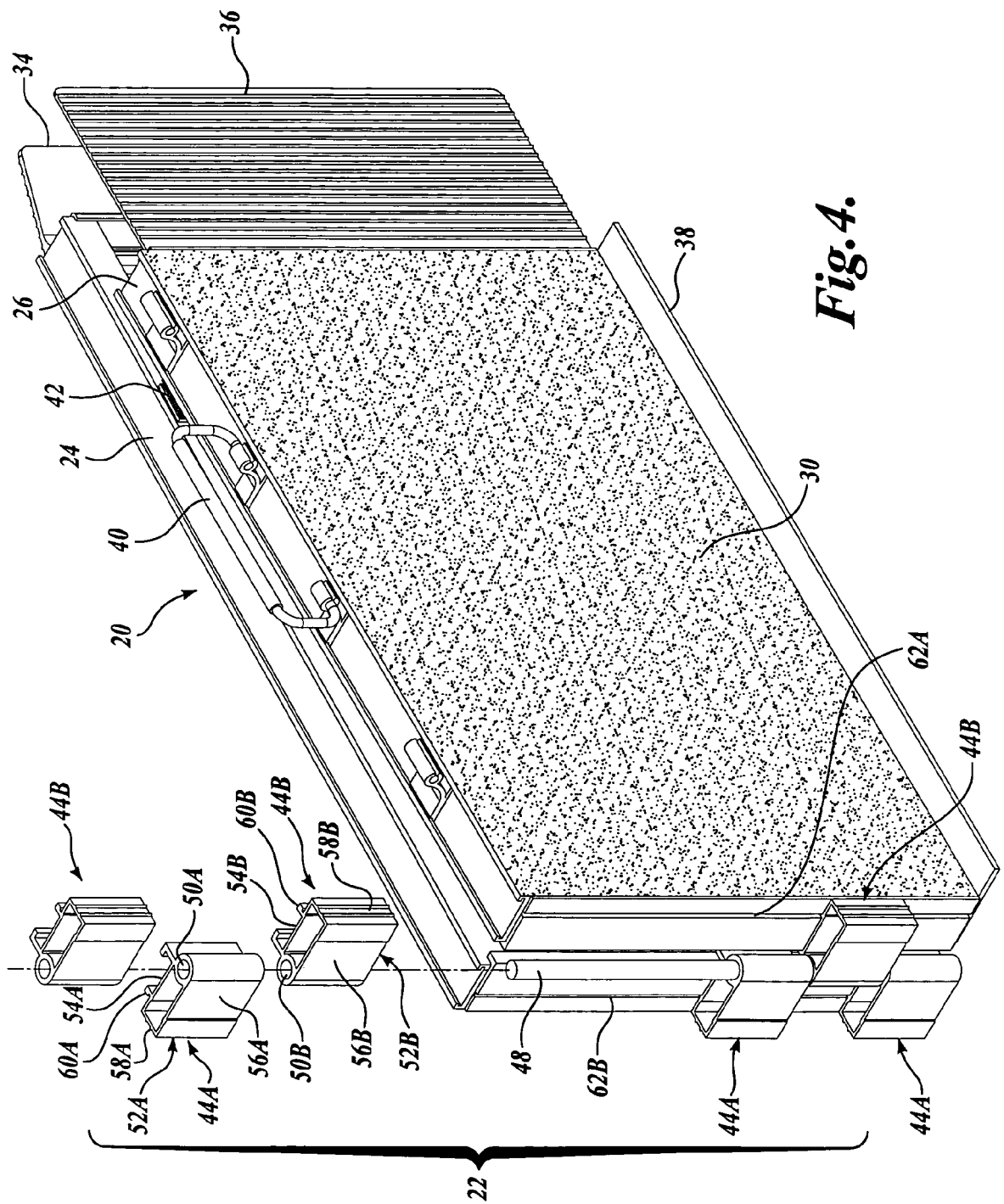
FIG. 4 is a partial exploded view of the folding ramp according to the embodiment of FIG. 1.
Figure 5:
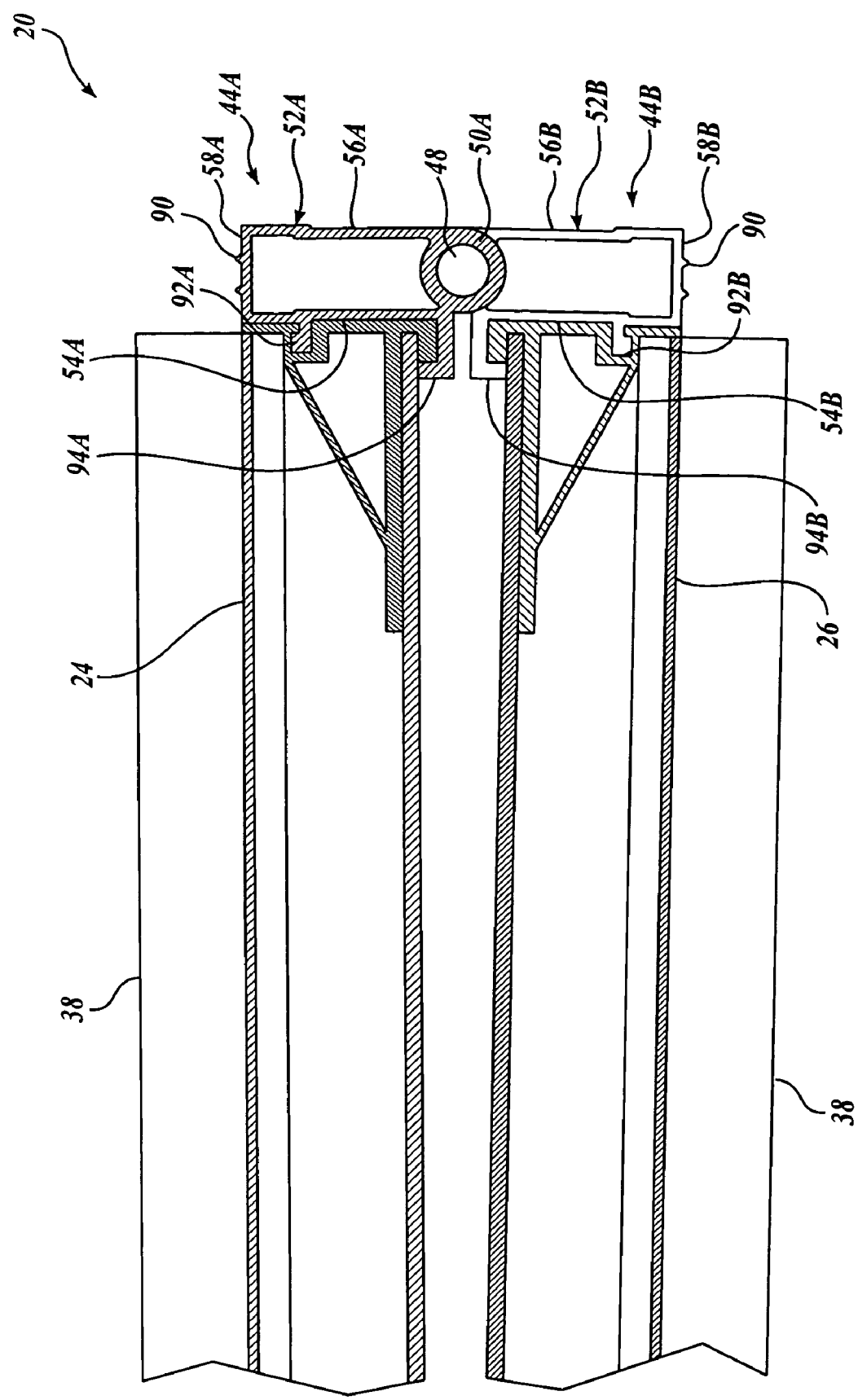
FIG. 5 is a partial cross-sectional view of the folding ramp according to the embodiment of FIGS. 1-3 illustrating one embodiment of a hinge assembly, wherein the folding ramp is in the ramp folded orientation.
Figure 6:
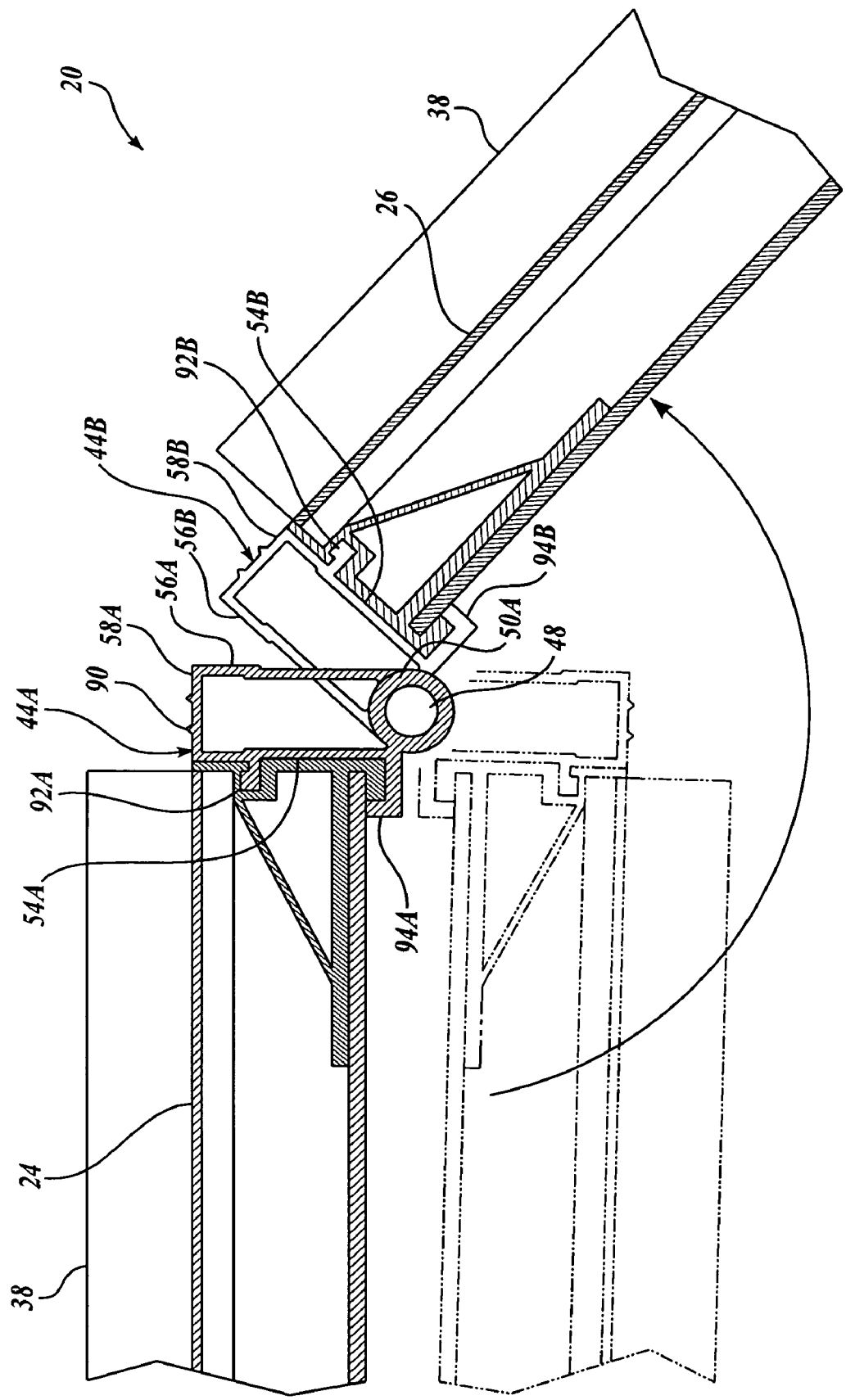
FIG. 6 is a partial cross-sectional view of the hinge assembly of the folding ramp according to the embodiment of FIGS. 1-3 illustrating one embodiment of a hinge assembly, wherein the folding ramp is in transition between the ramp folded orientation and the ramp extended orientation.
Figure 7:
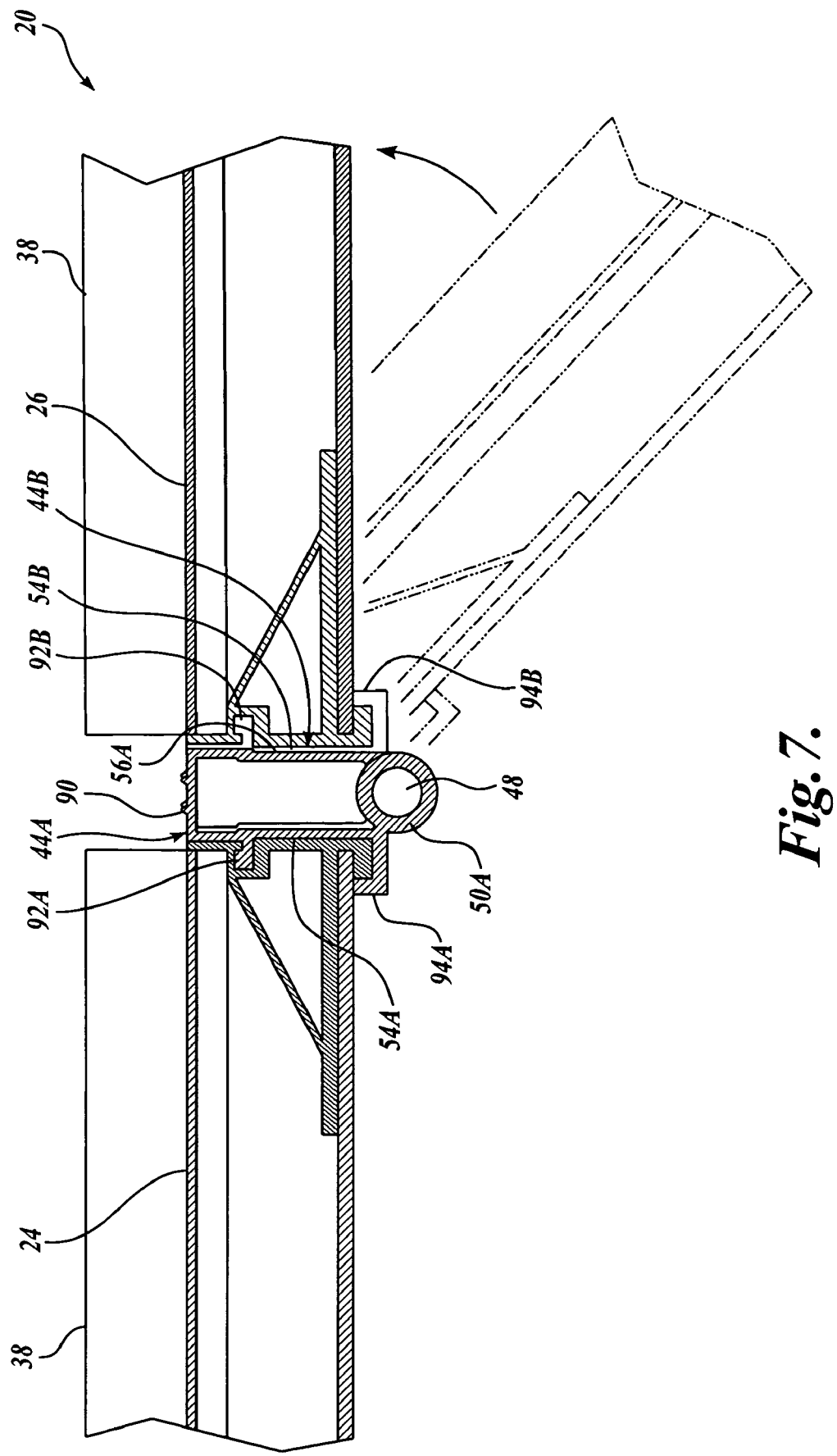
FIG. 7 is a partial cross-sectional view of the hinge assembly of the folding ramp according to the embodiment of FIGS. 1-3 illustrating one embodiment of a hinge assembly, wherein the folding ramp is in the ramp extended orientation.

Turning now to FIGS. 4-7, the hinge assembly 22 of the folding ramp 20 will be described in greater detail. The hinge assembly 22 includes at least first and second hinge collars 44A and 44B alternatingly disposed about a hinge pin 48. As seen in the sequence of FIGS. 5-7, the first and second hinge collars 44A and 44B are designed and configured to receive the hinge pin 48 such that they can freely rotate on the hinge pin 48. The first and second hinge collars 44A and 44B are coupled to the first and second ramp sections 24 and 26, respectively, so that the first and second ramp sections 24 and 26 rotate on the hinge pin 48. The coupling of the first and second hinge collars 44A and 44B to the first and second ramp sections 24 and 26, respectively, will be described in greater detail below.

While the hinge assembly 22 has been shown and described as having at least first and second hinge collars 44A and 44B, a hinge assembly with any number of hinge collars 44A and 44B is within the spirit and scope of the present disclosure. For example, the folding ramp 20 may include a hinge assembly 22 having the same number (e.g., one, two, three, etc.) of first and second hinge collars 44A and 44B, or a different number of first and second hinge collars 44A and 44B (e.g., two first hinge collars 44A and one second hinge collar 44B, etc.).

With reference to FIGS. 4-7, the first and second hinge collars 44A and 44B will now be described in greater detail. As seen in FIG. 4, each hinge collar 44A and 44B include bores 50A and 50B designed and configured to receive the hinge pin 48 in a rotational manner. The hinge collars 44A and 44B are identically manufactured parts, as described in detail below, that are positioned in reverse orientations when coupled to the first and second ramp sections 24 and 26. Because the first and second hinge collars 44A and 44B are coupled to the first and second ramp sections 24 and 26 in an opposing manner, these hinge collars 44A and 44B allow the first and second ramp sections 24 and 26 to pivotally transition in their positioning relative to one another, such that the ramp 20 transitions between a folded orientation (FIG. 1) and an extended orientation (FIG. 3).

Referring now to FIGS. 4-7, the first and second hinge collars 44A and 44B include ramp attachment portions 52A and 52B adjacent bores 50A and 50B, defining: ramp section attachment surfaces 54A and 54B; opposing ramp section contact surfaces 56A and 56B; and ramp section transition surfaces 58A and 58B interconnecting the ramp section attachment surfaces 54A and 54B and the opposing ramp section contact surfaces 56A and 56B, respectively. As best shown in FIGS. 5-7, the ramp section transition surfaces 58A and 58B are disposed at opposite ends of the hinge collars 44A and 44B with respect to the bores 50A and 50B. While the ramp attachment portions 52A and 52B are shown in the illustrated embodiment of FIGS. 1-7 as substantially rectangular-shaped tubular members with opposing ramp section contact surfaces 56A and 56B substantially parallel to the respective ramp section attachment surfaces 54A and 54B, other shaped ramp attachment portions 52A and 52B may also be used.

The ramp section attachment surfaces 54A and 54B further include coupling devices 60A and 60B (FIG. 4) for coupling with the respective first and second ramp sections 24 and 26 of the folding ramp 22. The coupling devices 60A and 60B are first portions of tongue and/or groove attachment devices designed and configured to connect with complementary second portions of tongue and/or groove coupling devices 62A and 62B (FIG. 4), respectively, on the first and second ramp sections 24 and 26. As will be discussed in greater detail below, during assembly the hinge collar coupling devices 60A and 60B are slideably engageable with the ramp section coupling devices 62A and 62B.

As the ramp transitions from a folded orientation to an extended orientation (FIG. 6), the ramp sections 24 and 26 pivot about the hinge pin 48. When the ramp 20 is in the extended orientation (FIG. 7), the opposing ramp section contact surfaces 56B and 56A abut the side walls of the ramp sections 24 and 26, respectively, thereby acting as stops for preventing the first or second ramp section 24 or 26 from rotating beyond the extended orientation. In this regard, the first and second ramp sections 24 and 26 pivotally transition by up to 90° about the hinge pin 48 and in their positioning relative to one another, such that the ramp 20 transitions between a folded orientation (FIG. 5) and an extended orientation (FIG. 7).

When in the extended orientation (FIGS. 6 and 7), the ramp section attachment surface 54A of the first hinge collar 44A and the ramp section contact surface 56B of the second hinge collar 44B (not shown) are aligned such that both are coplanar and in contact with the first ramp section 24, respectively, by attaching and contacting. Moreover, the ramp section attachment surface 54B of the second hinge collar 44B and the ramp section contact surface 56A of the first hinge collar 44A are aligned such that both are coplanar and in contact with the second ramp section 26, respectively, by attaching and contacting. In this manner, the ramp section contact surfaces 56B and 56A provide stops for the first and second ramp sections 24 and 26, respectively, to prevent the first or second ramp sections 24 and 26 from rotating on the hinge pin 48 beyond the extended orientation.

When in the extended orientation (FIGS. 6 and 7), the ramp section transition surfaces 58A and 58B of the first and second hinge collars 44A and 44B provide a complete transition surface between first and second ramp sections 24 and 26. In the illustrated embodiment of FIGS. 1-7, the ramp section transition surfaces 58A and 58B optionally include friction ridges 90 (see FIG. 7) to prevent user slippage along the transition surface when the folding ramp 20 is in use.

The first and second hinge collars 44A and 44B are made of any rigid material and can be formed by an extrusion process. In one embodiment, the hinge collars 44A and 44B are formed from extruded aluminum. In that regard, an elongated collar is formed from extruded aluminum having a center bore, a ramp section attachment surface, a ramp section contact surface, and a ramp section transition surface. Referring to FIG. 4, this elongated collar is cut into modular collars 44A and 44B which are oriented in either a first orientation (first hinge collar 44A) or a second orientation (second hinge collar 44B) along the hinge pin 48.

Such modular collars are easy to manufacture because no machining is required of the extruded aluminum other than straight cuts along the elongated collar substantially perpendicular to the direction of the center bore. In addition, collars 44A and 44B can be cut to differ in length relative to the hinge pin 48 to provide varying hinge dimensions for different folding ramp applications.

To assemble the hinge assembly 22 of the ramp 20, the first and second collars 44A and 44B are alternatingly oriented in first and second orientations along the hinge pin 48, as seen in FIG. 4. In this regard, the coupling devices 60A and 60B of the ramp section attachment surfaces 54A and 54B of the first and second hinge collars 44A and 44B, respectively, slidingly engage with the coupling devices 62A and 62B on the ends of the first and second ramp sections 24 and 26, respectively. Such alternating design provides a strong structural hinge that does not require welding to maintain the engagement between the hinge collars 44A and 44B and the ramp sections 24 and 26. The coupling devices 60A and 60B of the ramp section attachment surfaces 54A and 54B and the coupling devices 62A and 62B on the ends of the first and second ramp sections 24 and 26 are either tongued and/or grooved coupling devices. In the illustrated embodiment of FIGS. 1-7, the coupling devices 60A and 60B of the of the ramp section attachment surfaces 54A and 54B are primarily tongued portions, and the coupling devices 62A and 62B on the ends of the first and second ramp sections 24 and 26 are primarily grooved portions.

To further bolster the structural integrity of the hinge assembly 22, the tongued portions of the coupling devices 60A and 60B of the ramp section attachment surfaces 54A and 54B may include first and second lip extensions 92A and 94A and 92B and 94B, which are integrally extruded with the elongated collar, as seen in FIGS. 5-7. The first and second lip extensions 92A and 94A and 92B and 94B extend outwardly from the respective ramp section attachment surfaces 54A and 54B and upwardly in the direction of the deck sections 28 and 30 of the ramp sections 24 and 26. The lip extensions are received by grooves in the coupling devices 62A and 62B of the ramp sections 24 and 26.

When the ramp 20 is in use, the first and second lip extensions 92A and 94A and 92B and 94B provide load anchoring devices for distributing the load of the first and second ramp sections 24 and 26 (as well as any load on the ramp sections 24 and 26, such as a user) on the first and second lip extensions 92A and 94A and 92B and 94B. By distributing the load of the first ramp sections 24 and 26 on these extruded lip extensions 92A and 94A and 92B and 94B, the hinge assembly 22 has improved load anchoring, which makes the hinge assembly 22 less susceptible to fatigue than previously designed welded hinge assemblies.

After the first and second hinge collars 44A and 44B are slidingly engaged with the first and second ramp sections 24 and 26, the hinge pin 48 and the hinge collars 44A and 44B can be secured in place to prevent separation of these components. Such securement may be by spot welding (not shown) between the hinge collars 44A and 44B and the hinge pin 48 at one or both of the two ends of the hinge pin 48 to prevent sliding movement of the hinge collars 44A and 44B relative to the hinge pin 48 and such that at least one of the first and second hinge collars 44A and 44B rotates freely around the hinge pin 48. Such securement further may include spot welding between the hinge collars 44A and 44B and the ramp sections 24 and 26 to prevent sliding movement of the hinge collars 44A and 44B relative to the ramp sections 24 and 26. It should be appreciated, however, that in other embodiments of the present disclosure, the hinge pin and hinge collars can be secured by other methods besides spot welding known and used in the art, including securement caps or plates, or ring clamps.

Now referring to FIGS. 8-12, folding ramps having hinge assemblies in accordance with other embodiments of the present disclosure will now be described in greater detail. The assemblies are substantially identical in materials and operation as the previously described embodiment, except for differences regarding the number of ramp sections, which will be described in detail below. In that regard, the illustrated embodiment of FIGS. 8-12 includes four ramp sections.

For clarity in the ensuing descriptions, numeral references of like elements of the folding ramp 20 are similar, but are in the 100 series for the illustrated embodiment of FIGS. 8-12.

Figure 8:
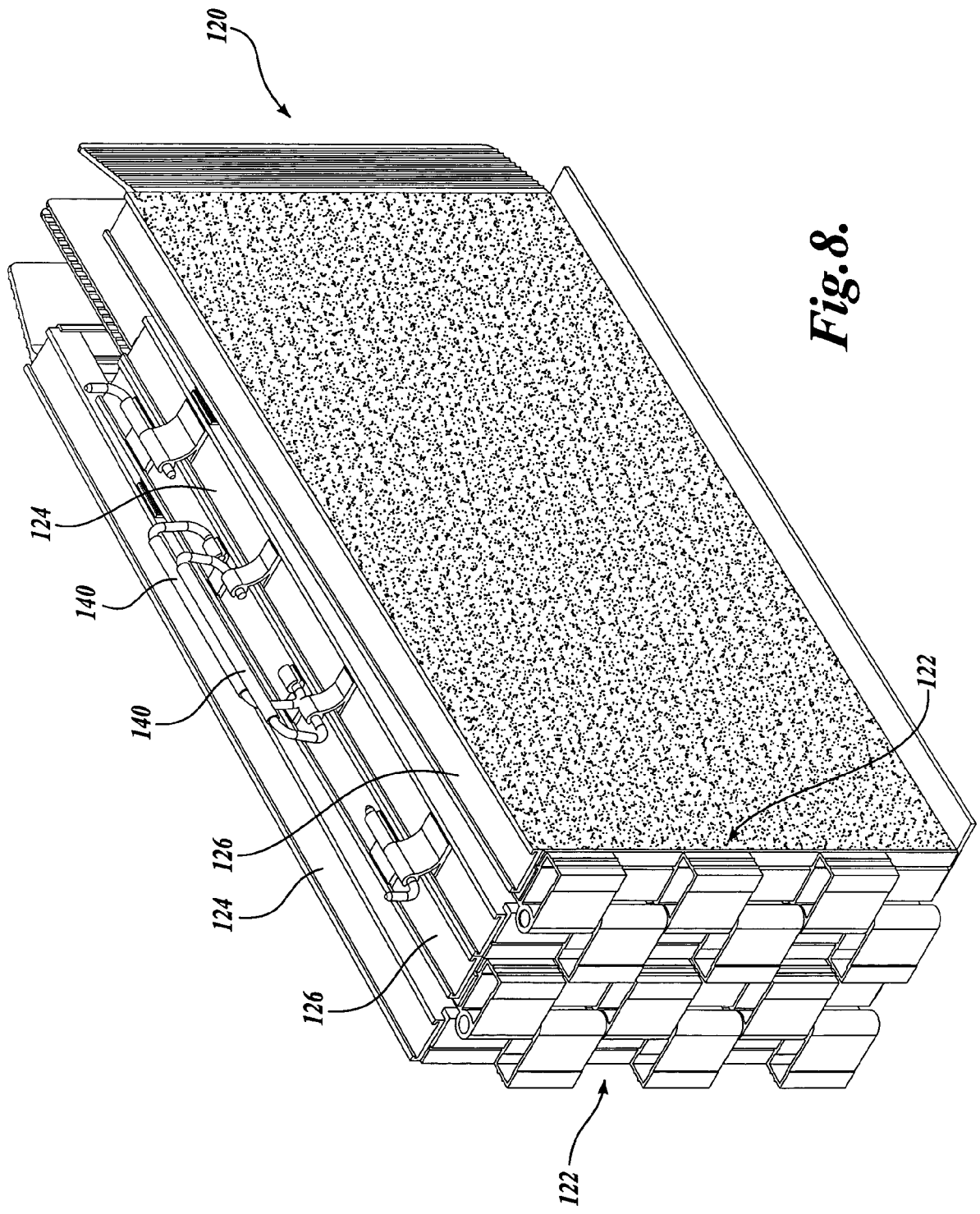
FIG. 8 is a perspective view of another exemplary embodiment of a folding ramp having a plurality of hinge assemblies and formed according to various aspects of the present disclosure, wherein the folding ramp is in a first ramp folded orientation.
Figure 9:
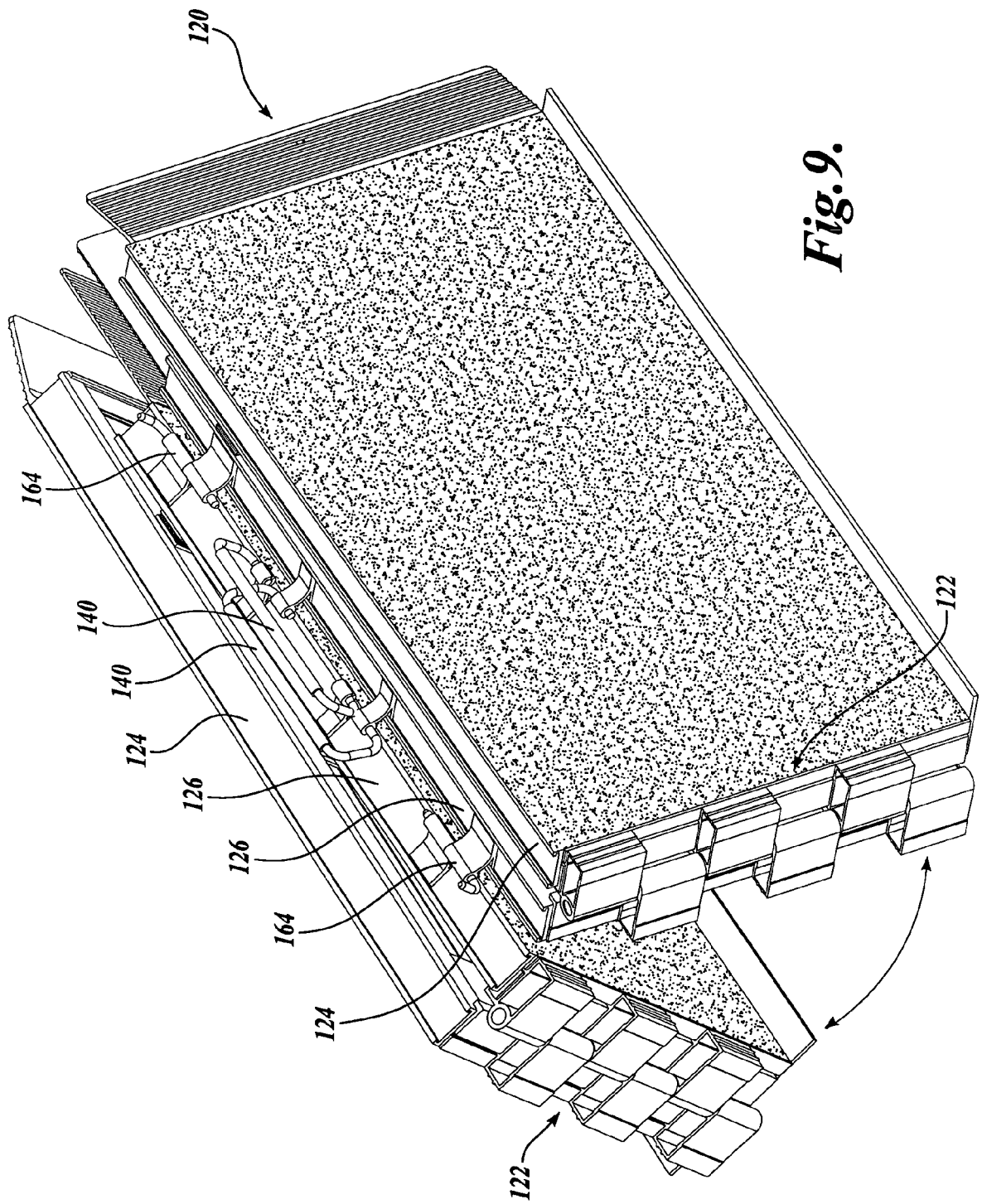
FIG. 9 is a perspective view of a folding ramp according to the embodiment of FIG. 8, wherein the folding ramp is in transition between the first ramp folded orientation and a second ramp folded orientation.
Figure 10:
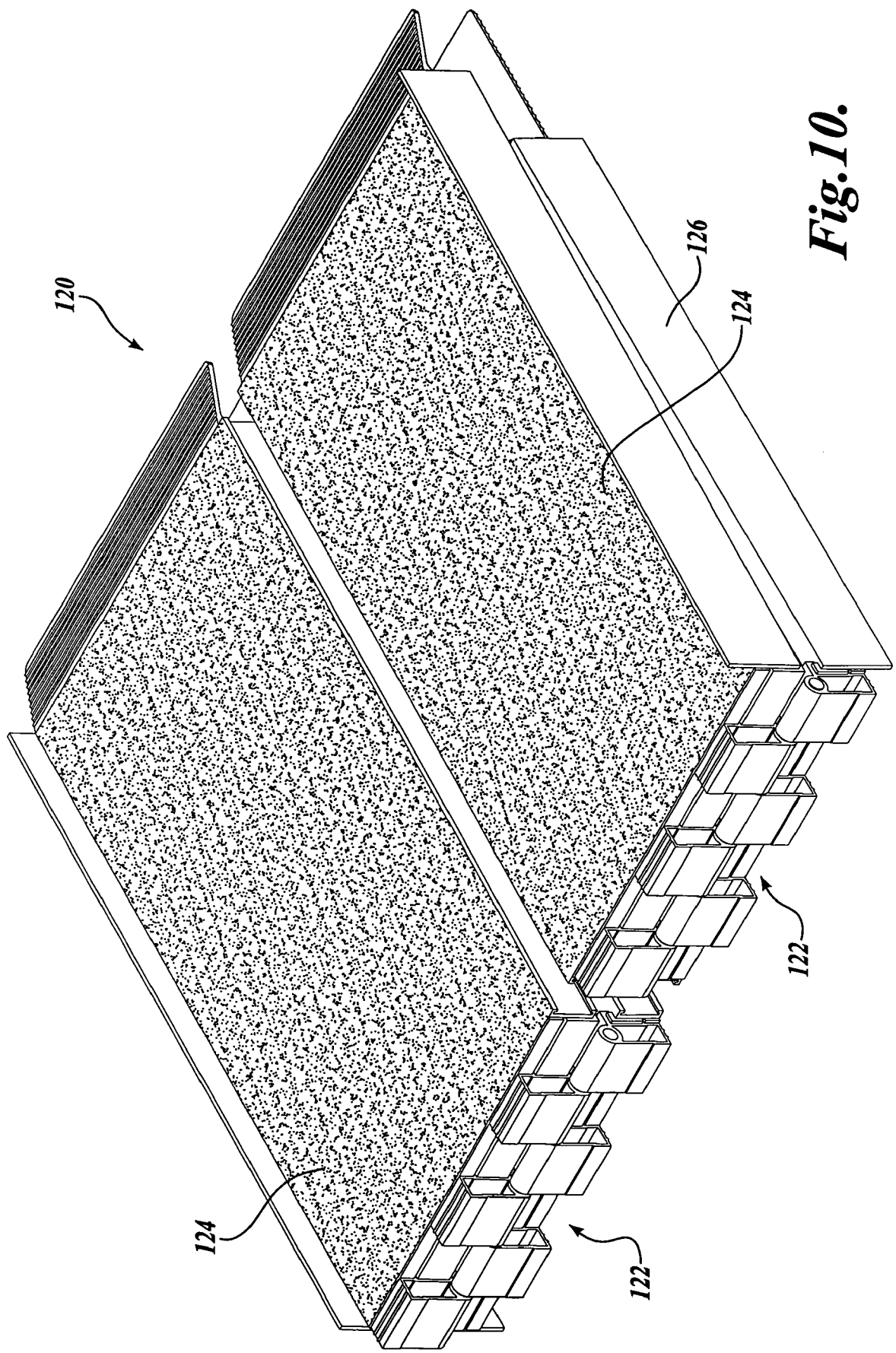
FIG. 10 is a perspective view of the folding ramp according to the embodiment of FIG. 8, wherein the folding ramp is in the second ramp folded orientation.
Figure 11:
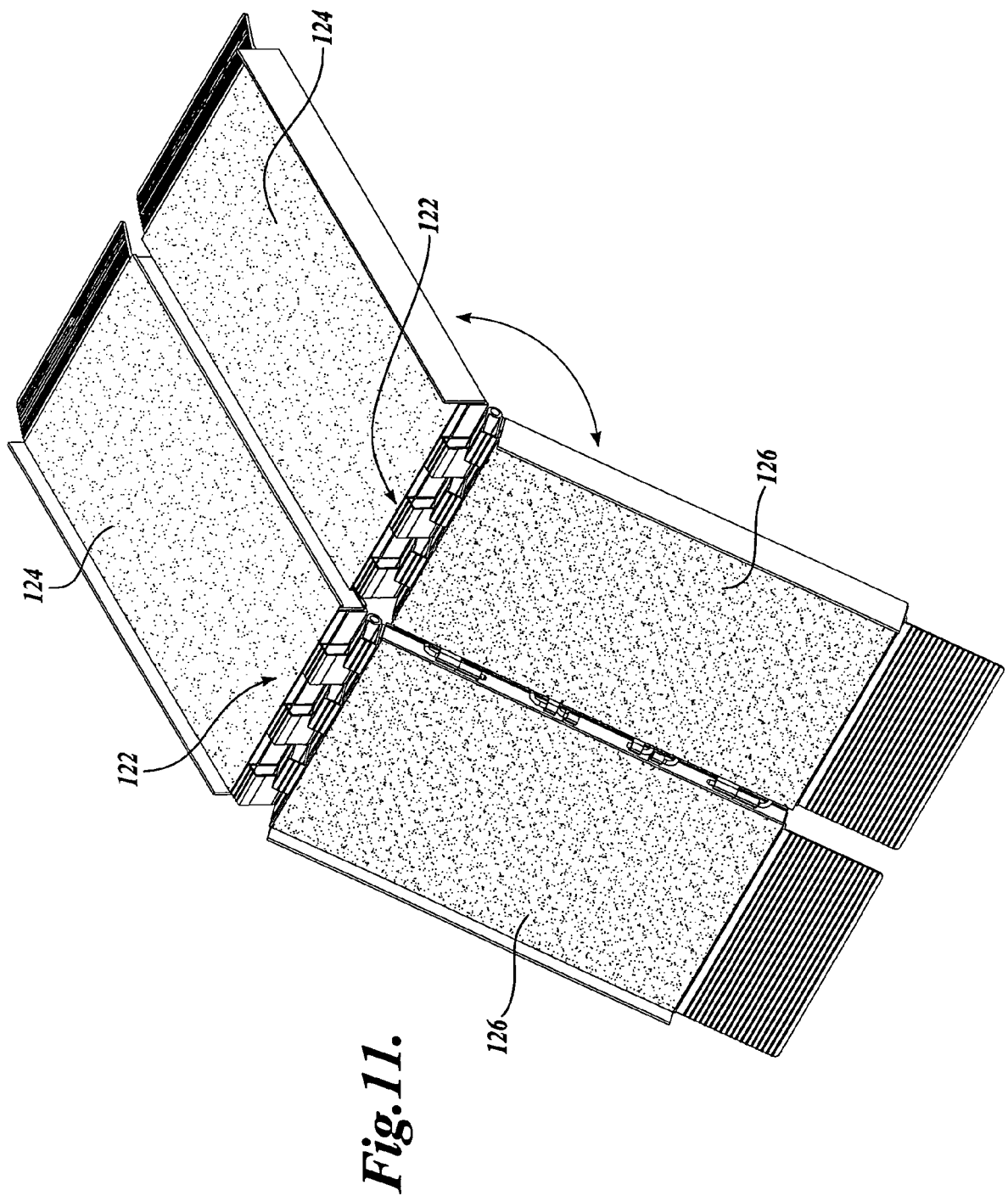
FIG. 11 is a perspective view of a folding ramp according to the embodiment of FIG. 8, wherein the folding ramp is in transition between the second ramp folded orientation and a ramp extended orientation.
Figure 12:
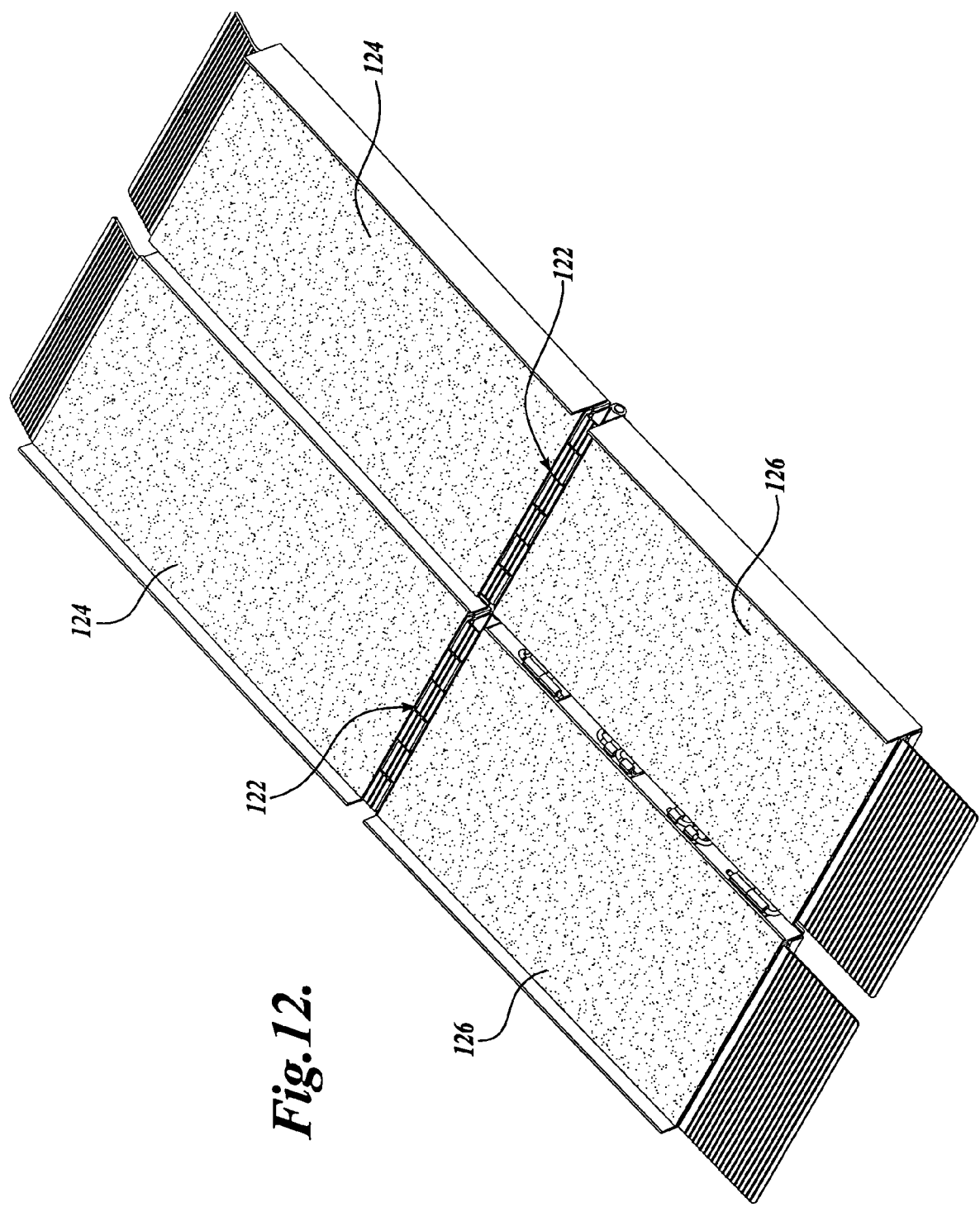
FIG. 12 is a perspective view of the folding ramp according to the embodiment of FIG. 8, wherein the folding ramp is in the ramp extended orientation.

As seen FIGS. 8-12, in another embodiment of the present invention, the folding ramp 120 includes two first ramp sections 124 and two second ramp sections 126, each coupled to one another by discrete hinge assemblies 122 and secondary hinges 164. In accordance with this embodiment, the ramp 120 transitions from the fully folded orientation to the fully extended orientation in three discrete folding operations, as seen in the sequence of FIGS. 8-12. As seen in FIG. 8, the ramp 120 is in the first folded orientation. In this orientation, the ramp 120 can be transported by bracketed handles 140 positioned along the side edges of the ramp sections. As seen in FIG. 9, the ramp 120 transitions from the first folded orientation (FIG. 8) to the second folded orientation (FIG. 10). Such transition is about secondary hinges 164, wherein at least one secondary hinge 164 rotatably couples at least one of the first or second ramp sections to at least one of the third or fourth ramp section. As seen in FIG. 11, the ramp 120 transitions from the second folded orientation (FIG. 10) to the extended orientation (FIG. 12). Such transition is about the two hinge assemblies 122.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A folding ramp, comprising:
    (a) at least first and second ramp sections;
    (b) a first hinge assembly coupling the first and second ramp sections, the first hinge assembly allowing the first and second ramp sections to be rotatably positionable between ramp folded and ramp extended orientations, the first hinge assembly including adjacent first and second collars, wherein a first portion of a tongue and groove coupling device of the first collar is coupled to a second portion of the tongue and groove coupling device of the first ramp section and a first portion of a tongue and groove coupling device of the second collar is coupled to a second portion of a tongue and groove coupling device of the second ramp section, and a hinge pin, wherein the first and second collars are designed and configured to rotate in opposite directions around the hinge pin, the first collar including a ramp attachment portion having a first ramp section attachment surface, a first transition surface, and a second ramp section contact surface and the second collar including a ramp attachment portion having a second ramp section attachment surface, a second transition surface, and a first ramp section contact surface, wherein the first and second collar ramp attachment portions are aligned in the ramp extended orientation such that the first ramp section attachment surface and the second ramp section contact surface are substantially co-planar, the second ramp section attachment surface and the first ramp section contact surface are substantially co-planar, and the first and second transition surfaces are substantially co-planar, whereby a complete transition section is formed between adjacent first and second ramp sections.

2. The folding ramp of claim 1, wherein the at least first and second ramp sections each have a deck section.

3. The folding ramp of claim 2, wherein the deck sections of the first and second ramp sections are substantially parallel to one another in the ramp folded orientation and the deck sections provide a substantially planar surface in the ramp extended orientation.

4. The folding ramp of claim 1, wherein the first and second collars include load anchoring devices for distributing the load of the first and second ramp sections.

5. The folding ramp of claim 4, wherein the load anchoring devices include at least one lip extension.

6. The folding ramp of claim 1, further comprising third and fourth ramp sections, each having a deck section, a second hinge assembly allowing the third and fourth ramp sections to be rotatably positionable between ramp folded and ramp extended orientations, and at least one secondary hinge rotatably coupling at least one of the first or second ramp sections to at least one of the third or fourth ramp section.

7. The folding ramp of claim 6, wherein the deck sections of the third and fourth ramp sections are substantially parallel to one another in the ramp folded orientation and the deck sections provide a substantially planar surface in the ramp extended orientation.

8. The folding ramp of claim 6, wherein the folding ramp further includes a fastening device for maintaining the ramp in the ramp folded orientation.

9. A folding ramp, comprising:
    (a) at least first and second ramp sections;
    (b) a first hinge assembly coupling the first and second ramp sections, the first hinge assembly allowing the first and second ramp sections to be rotatably positionable between ramp folded and ramp extended orientations, the first hinge assembly including adjacent first and second collars, wherein a first portion of a tongue and groove coupling device of the first collar is coupled to a second portion of the tongue and groove coupling device of the first ramp section and a first portion of a tongue and groove coupling device of the second collar is coupled to a second portion of a tongue and groove coupling device of the second ramp section, and a hinge pin, wherein the first and second collars are designed and configured to rotate in opposite directions around the hinge pin, the first collar including a ramp attachment portion having a first ramp section attachment surface and a second ramp section contact surface and the second collar including a ramp attachment portion having a second ramp section attachment surface and a first ramp section contact surface, wherein the first and second collar ramp attachment portions are aligned in the ramp extended orientation such that the first ramp section attachment surface and the second ramp section contact surface are substantially co-planar and the second ramp section attachment surface and the first ramp section contact surface are substantially co-planar, and wherein the first and second collar ramp attachment portions are aligned in the ramp folded orientation such that the first and second ramp section attachment surfaces are substantially co-planar and the first and second ramp section contact surfaces are substantially co-planar.

10. The folding ramp of claim 9, wherein the first collar further includes a first transition surface, and wherein the second collar further includes a second transition surface.

11. The folding ramp of claim 9, wherein the first and second collar ramp attachment portions are substantially aligned in the ramp extended orientation the first and second transition surfaces are substantially co-planar, whereby a complete transition section is formed between adjacent first and second ramp sections.

12. A folding ramp, comprising:
    (a) at least first and second ramp sections;
    (b) a first hinge assembly coupling the first and second ramp sections, the first hinge assembly allowing the first and second ramp sections to be rotatably positionable between ramp folded and ramp extended orientations, the first hinge assembly including adjacent first and second collars, wherein a first portion of a tongue and groove coupling device of the first collar is coupled to a second portion of the tongue and groove coupling device of the first ramp section and a first portion of a tongue and groove coupling device of the second collar is coupled to a second portion of a tongue and groove coupling device of the second ramp section, and a hinge pin, wherein the first and second collars are designed and configured to rotate in opposite directions around the hinge pin, the first collar including a ramp attachment portion having a first ramp section attachment surface and a second ramp section contact surface and the second collar including a ramp attachment portion having a second ramp section attachment surface and a first ramp section contact surface, wherein the first and second collar ramp attachment portions are substantially aligned in the ramp extended orientation such that the first ramp section attachment surface and the second ramp section contact surface are substantially co-planar, and wherein the first and second collar ramp attachment portions are substantially aligned in the ramp folded orientation such that the first and second ramp section attachment surfaces are substantially co-planar.

13. The folding ramp of claim 12, wherein the first collar further includes a first transition surface, and wherein the second collar further includes a second transition surface.

14. The folding ramp of claim 12, wherein the first and second collar ramp attachment portions are substantially aligned in the ramp extended orientation the first and second transition surfaces are substantially co-planar, whereby a complete transition section is formed between adjacent first and second ramp sections.

\* \* \* \* \*